United States Patent
Pietsch et al.

(10) Patent No.: US 7,820,738 B2
(45) Date of Patent: Oct. 26, 2010

(54) METHOD FOR PRODUCING POLYMER POWDERS THAT CAN BE EASILY REDISPERSED IN WATER

(75) Inventors: Ines Pietsch, Speyer (DE); Joachim Pakusch, Speyer (DE); Oliver Reese, Ludwigshafen am Rhein (DE); Heinrich Sack, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 798 days.

(21) Appl. No.: 10/589,268

(22) PCT Filed: Feb. 18, 2005

(86) PCT No.: PCT/EP2005/001675

§ 371 (c)(1), (2), (4) Date: Aug. 14, 2006

(87) PCT Pub. No.: WO2005/080478

PCT Pub. Date: Sep. 1, 2005

(65) Prior Publication Data

US 2007/0167539 A1 Jul. 19, 2007

(30) Foreign Application Priority Data

Feb. 25, 2004 (DE) .................... 10 2004 009 739

(51) Int. Cl.
C08J 3/00 (2006.01)
C08G 8/04 (2006.01)
(52) U.S. Cl. ........................ 523/340; 528/129
(58) Field of Classification Search ............... 525/189; 252/94.15; 528/150; 523/340
See application file for complete search history.

(56) References Cited

U.S. PATENT DOCUMENTS

| 3,883,489 | A | | 5/1975 | Matschke et al. | |
|---|---|---|---|---|---|
| 4,936,864 | A | * | 6/1990 | Fikentscher et al. | .......... 8/94.29 |
| 5,225,478 | A | | 7/1993 | Beckerle et al. | |
| 5,342,916 | A | * | 8/1994 | Weiser et al. | ............... 528/150 |
| 6,028,167 | A | | 2/2000 | Pakusch et al. | |
| 6,127,483 | A | * | 10/2000 | Weitzel et al. | ............... 525/189 |
| 6,469,135 | B2 | | 10/2002 | Sandor et al. | |
| 6,762,221 | B1 | | 7/2004 | Pakusch et al. | |
| 6,881,356 | B2 | * | 4/2005 | Pabst et al. | ................. 252/404 |
| 2004/0250353 | A1 | * | 12/2004 | Pabst et al. | ............... 8/94.19 R |
| 2006/0134446 | A1 | * | 6/2006 | Stumpf | ........................ 428/524 |

FOREIGN PATENT DOCUMENTS

| DE | 2 214 410 | | 10/1973 |
|---|---|---|---|
| DE | 24 45 813 | | 4/1976 |
| DE | 196 29 525 | A1 | 1/1998 |
| DE | 196 29 526 | A1 | 1/1998 |
| DE | 101 40 551 | A1 | 2/2003 |
| EP | 0 407 889 | A1 | 1/1991 |
| EP | 0 520 182 | A1 | 12/1992 |
| EP | 0 784 449 | | 7/1997 |
| EP | 1 184 406 | A2 | 3/2002 |
| WO | WO 96/03923 | | 2/1996 |
| WO | WO 03/016578 | * | 2/2003 |

* cited by examiner

*Primary Examiner*—Mark Eashoo
*Assistant Examiner*—Peter F Godenschwager
(74) *Attorney, Agent, or Firm*—Oblon, Spivak, McClelland, Maier & Neustadt, L.L.P.

(57) ABSTRACT

A process for the preparation of a readily water-redispersible polymer powder by spray drying of an aqueous polymer dispersion in the presence of a novel spray drying assistant.

19 Claims, No Drawings

METHOD FOR PRODUCING POLYMER POWDERS THAT CAN BE EASILY REDISPERSED IN WATER

The present invention relates to a process for the preparation of a readily water-redispersible polymer powder by spray drying of an aqueous polymer dispersion, wherein the spray drying of the aqueous polymer dispersion is effected in the presence of a spray assistant A which was obtained by reacting a dihydroxydiphenyl sulfone with from 0.5 to 5 mol of an aliphatic aldehyde of 1 to 6 carbon atoms and from 0.4 to 2 mol of sodium sulfite per mole of dihydroxydiphenyl sulfone at from 90 to 180° C.

The present invention furthermore relates to polymer powders which were prepared by the novel process and the use thereof.

In many applications, polymers which can be incorporated in a simple manner into an aqueous medium are required. In many cases, aqueous dispersions of polymer particles (aqueous polymer dispersions), which can frequently be used directly, are suitable for this purpose. A disadvantage of aqueous polymer dispersions, however, is that they require a water content of up to 60% by weight on storage of large volumes and, when delivered to the customers, water which is economically available everywhere also has to be transported in addition to the desired polymer, adding to the costs.

This problem is frequently solved by subjecting the aqueous polymer dispersions, which are obtainable, inter alia, by a free radical aqueous emulsion polymerization familiar to a person skilled in the art, to a spray drying process for the preparation of corresponding polymer powders, which is likewise familiar to a person skilled in the art.

With the use of these polymer powders, for example as binders in adhesives, sealing compounds, synthetic resin renders, paper coating slips, surface coating compositions and other coating materials or as additives in mineral binders, the polymer powders generally have to be redispersed in water. This can be effected either by redispersing the polymer powder in water and using the aqueous polymer dispersion obtained for mixing with the other formulation components, or by mixing the polymer powder together with the other formulation components with water. In both cases, it is important that, when brought into contact with water, the polymer powder forms the original polymer particles again rapidly and without formation of agglomerates. The basis for this is the instant behavior of the polymer powder used in water, which is composed of the redispersing behavior and the wetting behavior of the polymer powder.

The redispersing behavior is an important property for the quality of the polymer powder. The better the redispersing behavior of a polymer powder in water, the more closely do the properties of the aqueous polymer dispersion after the redispersing approach the properties of the aqueous polymer dispersion before the spray drying step. In other words, the redispersing behavior of the polymer powder is a measure of the extent to which the original and the redispersed aqueous polymer dispersion correspond in their properties.

If, moreover, the polymer powder also has good wetting behavior, the formation of the aqueous polymer dispersion can also take place without the use of an intensive mixing technique during the redispersing, which has advantages in practice.

While the redispersing behavior of a polymer powder is influenced as a rule substantially by the spray assistants used in the spray drying. process, the wetting behavior is determined by the surface characteristics of the polymer powder particle. Said characteristics are frequently determined by the antiblocking agent adhering to the surface of the polymer powder particle.

A person skilled in the art is familiar with a large number of spray assistants in the spray drying of aqueous polymer dispersions. Examples of these are to be found in DE-A 19629525, DE-A 19629526, DE-A 2214410, DE-A 2445813, EP-A 407889 or EP-A 784449.

For cost reasons, spray assistants which are prepared on the basis of economically available raw materials are frequently used. Examples of these are sulfonated phenol or naphthalene/formaldehyde resins, as disclosed, inter alia, in DE-A 19629525 or DE-A 19629526. A disadvantage of these sulfonated phenol or naphthalene/formaldehyde resins is, however, the fact that they may lead to an intense yellow or even brown color of the polymer powders spray-dried with them. These discolorations also present problems in the case of the formulations prepared using these polymer powders, in particular exterior coating formulations, which becomes evident from discolorations of the formulations themselves, which may be further reinforced particularly by sunlight. In many polymer powder applications, for example when they are used as binders or modifiers in mineral renders or in linings of drinking water containers, discoloration of the polymer powder or of the formulations thereof is not desirable.

It is an object of the present invention to provide an improved process for the preparation of polymer powders by spray drying of aqueous polymer dispersions.

It has been found, surprisingly, that this object is achieved by the process defined at the outset.

Aqueous polymer dispersions are generally known. They are fluid systems which comprise, as a disperse phase in an aqueous dispersing medium, polymer coils consisting of a plurality of entangled polymer chains, i.e. the polymer matrix or polymer particles in dispersed form. The weight average diameter of the polymer particle is frequently from 10 to 1000 nm, often from 50 to 500 nm or from 100 to 400 nm.

Aqueous polymer dispersions are obtainable in particular by free radical aqueous emulsion polymerization of ethylenically unsaturated monomers. This method has been often described in the past and is therefore sufficiently well known to a person skilled in the art [cf. for example Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, 2nd Edition, Vol.1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 24 (1990), pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969, and DE-A 40 03 422]. The free radical aqueous emulsion polymerization is usually effected by a procedure in which the ethylenically unsaturated monomers are dispersed in an aqueous medium, frequently in the presence of dispersants, and are polymerized by means of at least one free radical polymerization initiator. In the aqueous polymer dispersions obtained, the residual contents of unreacted monomers are frequently reduced by chemical and/or physical methods likewise known to a person skilled in the art [cf. for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is brought to a desired value by dilution or concentration, or further conventional additives, for example bactericidal or antifoam additives, are added to the aqueous polymer dispersion. Frequently, the polymer solids contents of the aqueous polymer dispersions are from 30 to 80, from 40 to 70 or from 45 to 65% by weight.

The novel process can be carried out in particular with aqueous polymer dispersions whose polymer particles comprise from 50 to 99.9% by weight of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate, vinyl esters of versatic acid, vinyl esters of long-chain fatty acids and/or ethylene incorporated in the form of polymerized units.

According to the invention, it is possible in particular to use those aqueous polymer dispersions whose polymers comprise from 0.1 to 5% by weight of at least one $\alpha,\beta$-monoethylenically unsaturated mono- and/or dicarboxylic acid of 3 to 6 carbon atoms and/or an amide thereof and from 50 to 99.9% by weight of at least one ester of acrylic and/or methacrylic acid with alkanols of 1 to 12 carbon atoms and/or styrene, or from 0.1 to 5% by weight of at least one $\alpha,\beta$-monoethylenically unsaturated mono- and/or dicarboxylic acid of 3 to 6 carbon atoms and/or an amide thereof and from 50 to 99.9% by weight of styrene and/or butadiene, or from 0.1 to 5% by weight of at least one $\alpha,\beta$-monoethylenically unsaturated mono- and/or dicarboxylic acid of 3 to 6 carbon atoms and/or an amide thereof and from 50 to 99.9% by weight of vinyl chloride and/or vinylidene chloride, or from 0.1 to 5% by weight of at least one $\alpha,\beta$-monoethylenically unsaturated mono- and/or dicarboxylic acid of 3 to 6 carbon atoms and/or an amide thereof and from 40 to 99.9% by weight of vinyl acetate, vinyl propionate, vinyl esters of versatic acid, vinyl esters of long-chain fatty acids and/or ethylene incorporated in the form of polymerized units.

According to the invention, it is possible to use those polymers whose glass transition temperature is from −60 to +150° C., often from −30 to +100° C., frequently from −20 to +50° C. The glass transition temperature ($T_g$) means the limit of the glass transition temperature to which said glass transition temperature tends, according to G. Kanig (Kolloid-Zeitschrift & Zeitschrift füer Polymere, Vol. 190, page 1, equation 1), with increasing molecular weight. The glass transition temperature is determined by the DSC method (differential scanning calorimetry, 20 K/min, midpoint measurement, DIN 53 765).

According to Fox (T. G. Fox, Bull. Am. Phys. Soc. 1 (1956) [Ser. II], page 123 and according to Ullmann's Enzyclopädie der technischen Chemie, Vol. 19, page 18, 4th Edition, Verlag Chemie, Weinheim, 1980), the following is a good approximation for the glass transition temperature of at most weakly crosslinked copolymers:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the polymers composed in each case only of one of the monomers 1, 2, .... n. The $T_g$ values for the homopolymers of most monomers are known and are shown, for example, in Ullmann's Encyclopedia of Industrial Chemistry, 5th Edition, Vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York, 1966; 2nd Ed. J. Wiley, New York, 1975 and, 3rd Ed. J. Wiley, New York, 1989.

The spray assistant A is prepared by reacting dihydroxydiphenyl sulfone with from 0.5 to 5 mol of an aliphatic aldehyde of 1 to 6 carbon atoms and from 0.4 to 2 mol of sodium sulfite per mole of dihydroxydiphenyl sulfone at from 90 to 180° C. The synthesis of the dihydroxydiphenyl sulfone reaction product used as spray assistant A employed according to the invention is described in detail as component B of a sulfone-containing tanning agent in DE-A 10140551, which is hereby incorporated by reference.

In the preparation of the spray assistant A, dihydroxydiphenyl sulfone is reacted with from 0.5 to 5, preferably from 1 to 1.4, particularly preferably from 1.1 to 1.3, in particular about 1.2, mol of an aliphatic aldehyde, per mole of dihydroxydiphenyl sulfone, and from 0.4 to 2, preferably from 0.5 to 0.8, in particular from 0.6 to 0.7, mol of sodium sulfite per mole of dihydroxydiphenyl sulfone at from 90 to 180° C. in one step. The reaction is usually carried out in aqueous solution under pressure. For example, dihydroxydiphenyl sulfone and aldehyde in the form of their aqueous solutions and solid sodium sulfite are introduced into a pressure-resistant reactor and the mixture is heated to 115° C. After initiation of the reaction, the temperature increases to about 150 to 160° C. and the pressure to about 4 to 5 bar. In general, the reaction lasts for from 2 to 10 hours.

In the context of this invention, dihydroxydiphenyl sulfone is understood as meaning all possible isomeric dihydroxy compounds of diphenyl sulfone, it being possible for the two hydroxyl groups to be bonded to one phenyl radical. However, it is also possible for one hydroxyl group each to be bonded per phenyl radical. Preferably, each phenyl radical comprises a hydroxyl group. The hydroxyl may be bonded in the 2-, 3- or 4-position of one phenyl radical and in the 2'-, 3'- or 4'-position of the other phenyl radical. It is particularly advantageous if the hydroxyl groups are bonded in the 2- and 4'-position or in the 4- and 4'-position of the diphenyl sulfone. The 4,4'-isomer is preferred. It is also possible to use dihydroxydiphenyl sulfone mixtures. An industrial 4,4'-dihydroxydiphenyl sulfone mixture which, in addition to 4,4'-dihydroxydiphenyl sulfone as the main component, also comprises about 10-15% by weight of the 2,4'-isomer and from 0 to 5% by weight of p-phenylsulfonic acid as secondary components is frequently used.

The aliphatic aldehydes used in the preparation of the spray assistant A have in general 1 to 6, preferably 1 to 4, particularly preferably 1 or 2, carbon atoms. In particular, formaldehyde is used as the aliphatic aldehyde, usually in the form of an aqueous solution, for example in the form of a 30% strength by weight aqueous solution. However, it is also possible to use, for example, acetaldehyde, propionaldehyde, butyraldehyde or isobutyraldehyde, pentanal, hexanal or the isomeric aldehyde compounds thereof and corresponding aldehyde mixtures.

It is advantageous if the aqueous solution of the spray assistant A which is obtained from the synthesis is brought to a pH $\geq 7$. A pH of $\leq 10$ is advantageous. Frequently, a pH of about 8 is established. A person skilled in the art may use familiar organic or inorganic acids or bases for establishing the pH.

The novel spray assistant A can be used directly in the form of its aqueous solution resulting from the synthesis. However, it is also possible to use the spray assistant A in the form of powders which are obtained by drying the aqueous solution resulting from the synthesis of the spray assistant A, for example by spray drying. The spray assistant is preferably used in the form of its aqueous solution.

The fact that the spray assistant A (both in the form of its aqueous solution and in the form of a solid) can be used as a mixture with at least one other spray assistant B (likewise in the form of the aqueous solution or as a solid) differing from the spray assistant A is important. Advantageously, the total amount of the spray assistant comprises $\geqq 50$, $\geqq 60$, $\geqq 70$, $\geqq 80$ or $\geqq 90$ and frequently even 100% by weight of spray assistant A.

For example, the spray assistants disclosed in the prior art mentioned below, also referred to as drying assistants, can be used as spray assistant B. Thus, DE-A 2049114 recommends adding condensates of melaminesulfonic acid and formaldehyde as spray assistants to aqueous polymer dispersions. DE-A 2445813 and EP-A 78449 recommend adding condensates of naphthalenesulfonic acid and formaldehyde (in particular the water-soluble alkali metal and/or alkaline earth metal salts thereof as drying assistants to aqueous polymer dispersions. EP-A 407889 recommends adding condensates of phenolsulfonic acid and formaldehyde (in particular the water-soluble alkali metal and/or alkaline earth metal salts thereof) as drying assistants to aqueous polymer dispersions. DE-B 2238903 and EP-A 576844 recommend the use of poly-N-vinylpyrrolidone as such a spray assistant. EP-A 62106 and EP-A 601518 recommend the use of polyvinyl alcohol as a drying assistant. Polyvinyl alcohol is also recommended by U. Rietz in Chemie und Technologie makromolekularer Stoffe (FH-texts FH Aachen) 53 (1987) 85 and in EP-A 680 993 and in EP-A 627450 as a drying assistant. Ligninsulfonates are mentioned as drying assistants in DE-A 3344242. DE-A 19539460, EP-A 671435 and EP-A 629650 disclose homo- and copolymers of 2-acrylamido-2-methylpropanesulfonic acid as suitable drying assistants for aqueous polymer dispersions. EP-A 467103 relates to the preparation of polymer powders, redispersible in an aqueous medium, by drying with addition of copolymers of from 50 to 80 mol % of an olefinically unsaturated mono-and/or dicarboxylic acid and from 20 to 50 mol % of a C3- to C12-alkene and/or styrene as drying assistants. DE-A 2445813 recommends condensates containing sulfone groups and comprising mononuclear or polynuclear aromatic hydrocarbons and formaldehyde as drying assistants. In DE-A 4406822, graft polymers of polyalkylene oxides and unsaturated mono- and/or dicarboxylic acids or the anhydrides thereof, after derivatization with primary/secondary amines or alcohols, are recommended as drying assistants. DE-A 3344242 and EP-A 536597 mention starch and starch derivatives as suitable drying assistants. In DE-A 493168, organopolysiloxanes are recommended as drying assistants. DE-A 3342242 furthermore mentions cellulose derivatives as suitable drying assistants and DE-A 4118007 recommends condensates of sulfonated phenols, urea, further organic nitrogen bases and formaldehyde as drying assistants.

The total amount of spray assistant A (calculated as solid) which is added to the aqueous polymer dispersion before or during, in particular however before, the spray drying is from 0.1 to 40, frequently from 1 to 25, often from 5 to 25, parts by weight, based in each case on 100 parts by weight of the polymer which is contained in aqueous dispersion and is to be spray dried.

According to TIZ-Fachberichte, Vol. 109, No. 9, 1985, page 698 et seq., the spray assistants usually used are as a rule water-soluble substances which, on spray drying of the aqueous polymer dispersion to give the polymer powder, form a matrix into which the water-insoluble primary polymer particles surrounded by dispersant are embedded. The matrix surrounding and protecting the primary polymer particles counteracts irreversible formation of secondary particles. Thus, reversible formation of secondary particles (agglomerates having a size of, typically, from 1 to 250 µm), which comprise numerous primary polymer particles separated from one another by the spray assistant matrix, generally takes place. When the polymer powders obtained according to the invention are redispersed with water, the matrix dissolves again and the original primary polymer particles surrounded by dispersant are substantially obtained again. Often, finely divided antiblocking agents are also added to the secondary particles reversibly formed in the form of polymer powder, which antiblocking agents act as spacers and, for example, counteract their caking on storage of the polymer powder under the action of the pressure imposed by its own weight, it being possible to effect this addition of antiblocking agent before, during and/or after the spray drying.

The antiblocking agents are as a rule powders of inorganic solids, having a mean particle size of from 0.1 to 20 µm, frequently from 1 to 10 µm (based on ASTM C 690-1992, Multisizer/100 µm capillary). It is advantageous if the inorganic substances have a solubility of $\leqq 50$, $\leqq 10$ or $\leqq 5$ g/l in water at 20° C.

Silicas, aluminum silicates, carbonates, for example calcium carbonate, magnesium carbonate or dolomite, sulfates, for example barium sulfate, and talcs, calcium sulfate, cements, dolomite, calcium silicates or diatomaceous earth may be mentioned by way of example. Mixtures of the above-mentioned compounds, for example microintergrowths of silicates and carbonates, are also suitable.

Depending on their surface characteristics, the antiblocking agents may have hydrophobic (water-repellent) or hydrophilic (water-attracting) properties. A measure of the hydrophobicity or hydrophilicity of a substance is the contact angle of a drop of demineralized water on a compact of the corresponding antiblocking agent. The larger the contact angle of the water drop on the surface of the compact, the greater is the hydrophobicity or the lower is the hydrophilicity, and vice versa. In order to decide whether one antiblocking agent is more hydrophobic or more hydrophilic than another, standard sieve fractions (=identical particle sizes or particle size distributions) of both antiblocking agents are produced. Compacts having level surfaces are produced from these sieve fractions of identical sizes or size distributions under identical conditions (amount, area, compression pressure, temperature). A water drop is applied by means of a pipette to each compact and immediately thereafter the contact angle between compact surface and water drop is determined. The larger the contact angle between compact surface and water drop, the greater is the hydrophobicity or the lower is the hydrophilicity. Frequently, both hydrophobic and hydrophilic antiblocking agents are used. It may be advantageous if the spray drying of the aqueous polymer dispersion is effected in the presence of a hydrophobic antiblocking agent and the resulting polymer powder is homogeneously mixed with a hydrophilic antiblocking agent in a subsequent step.

In the context of this document, hydrophilic antiblocking agents are understood as meaning those antiblocking agents which are more hydrophilic than the hydrophobic antiblocking agents used, i.e. their contact angles are smaller than those of the hydrophobic antiblocking agents used in the spraying process.

Frequently, the hydrophobic antiblocking agents have a contact angle of $\geq 90°$, $\geq 100°$ or $\geq 110°$, while the hydrophilic antiblocking agents have a contact angle of $<90°$, $\leq 80°$ or $\leq 70°$. It is advantageous if the contact angles of the hydrophobic and hydrophilic antiblocking agents used differ by $\geq 10°$, $\geq 20°$, $\geq 30°$, $\geq 40°$, $\geq 50°$, $\geq 60°$, $\geq 70°$, $\geq 80°$ or $\geq 90°$.

Hydrophilic antiblocking agents used are, for example, silicas, quartz, dolomite, calcium carbonate, sodium/aluminum silicates, calcium silicates or microintergrowths of silicates and carbonates, and hydrophobic antiblocking agents used are, for example, talc (magnesium hydrosilicate having a sheet structure), chlorite (magnesium/aluminum/iron hydrosilicate), silicas treated with organochlorosilanes (DE-A 3101413) or generally hydrophilic antiblocking agents which are coated with hydrophobic compounds, for example precipitated calcium carbonate coated with calcium stearate.

It is advantageous if from 0.001 to 10 parts by weight and often from 0.1 to 1 part by weight of a hydrophobic antiblocking agent and from 0.01 to 30 parts by weight and often from 1 to 10 parts by weight of a hydrophilic antiblocking agent are used per 100 parts by weight of the polymer present in the aqueous polymer dispersion. It is particularly advantageous if the ratio of the hydrophobic antiblocking agent to the hydrophilic antiblocking agent is 0.001 to 0.25:1 or 0.004 to 0.08:1.

Optimum results are obtained if aqueous polymer dispersions having a weight average particle size of from 100 to 1000 nm, often from 100 to 500 nm ($d_{50}$ values, determined using an analytical ultracentrifuge), are used and the ratio of the mean secondary particle diameter (mean polymer powder diameter; after the spray-drying, frequently from 30 to 150 µm, often from 50 to 100 µm, determined on the basis of ASTM C 690-1992, Multisizer/100 µm capillary) to the mean particle diameter of the hydrophobic and the hydrophilic antiblocking agents is 2 to 50:1 or 5 to 30:1.

The spray drying known to a person skilled in the art is effected in a drying tower with the aid of atomizer disks or airless high-pressure nozzles or binary nozzles in the top of the tower. The drying of the aqueous polymer dispersion with prior addition of the spray assistant A and optionally at least one further spray assistant B is carried out using a hot gas, for example nitrogen or air, which is blown into the tower from below or above, but preferably from above cocurrent with the material to be dried. The temperature of the drying gas at the tower entrance is from about 90 to 180° C., preferably from 110 to 160° C., and that at the tower exit is from about 50 to 90° C., preferably from 60 to 80° C. The hydrophobic antiblocking agent is frequently introduced into the drying tower simultaneously with the aqueous polymer dispersion but spatially separately therefrom. The addition is effected, for example, via a binary nozzle or conveying screw, in the form of a mixture with the drying gas or via a separate orifice.

The polymer powder discharged from the drying tower is cooled to 20 to 30° C. and frequently mixed with a hydrophilic antiblocking agent in commercial mixers, for example a Nauta mixer, as supplied by numerous companies.

The polymer powders obtainable according to the invention can be used in particular as binders in adhesives, sealing compounds, synthetic resin renders, paper coating slips, surface coating compositions and other coating materials or as an additive in mineral binders.

The polymer powders obtained according to the invention can also be redispersed in a simple manner in water, the primary polymer particles substantially being obtained again.

The polymer powders obtained according to the invention have a very good shelf-life and flowability. They produce little dust and can be redispersed in a simple manner in water without a great mixing effort. The polymer powders obtained are particularly suitable for use as binders in adhesives, sealing compounds, synthetic resin renders, paper coating slips, surface coating compositions and other coating materials or as additives in mineral binders. The fact that the polymer powders obtained are virtually colorless and furthermore no undesired discolorations occur when they are used as binders or as additives is moreover important.

EXAMPLES

1. Preparation of an Aqueous Polymer Dispersion 1.1 Polymer Dispersion D1

In a polymerization reactor, 397.2 g of a polystyrene seed dispersion having a polymer solids content of 0.18% by weight and a weight average particle diameter of 30 nm ($d_{50}$ value, determined by means of an analytical ultracentrifuge)

were heated to 90° C. with stirring and under a nitrogen atmosphere. Thereafter, beginning at the same time and while maintaining the internal temperature of 90° C., an aqueous monomer emulsion consisting of 1044.0 g of n-butyl acrylate, 362.5 g of styrene, 29.0 g of acrylamide, 14.5 g of methacrylamide, 246.5 g of a 10% strength by weight aqueous solution of an alkylpolyethylene glycol ether based on a saturated C16-18-fatty alcohol (ethylene oxide [EO] degree 18) [emulsifier solution 1], 29.0 g of a 15% strength by weight aqueous solution of a sodium salt of a C10-16-fatty alcohol ether sulfate (EO degree 30) [emulsifier solution 2] and 359.9 g of demineralized water and a solution consisting of 8.4 g of sodium peroxodisulfate and 112 g of demineralized water were added continuously to this mixture in 3 hours. Thereafter, the reaction mixture was stirred for a further 30 minutes at 90° C. and then cooled to 60° C. After addition of a solution of 2.9 g of tert-butyl hydroperoxide in 26.1 g of demineralized water, a solution of 4.4 g of sodium hydroxymethanesulfinate in 29 g of demineralized water was added at this temperature in the course of 2 hours and stirring was then effected for a further 30 minutes. Thereafter, cooling to 20 to 25° C. (room temperature) was effected and a pH of 8 was established with a 20% strength by weight aqueous calcium hydroxide slurry. A polymer dispersion having a solids content of 54.9% by weight, with a light transmittance of a 0.01% strength by weight polymer dispersion at 20° C. and a layer thickness of 2.5 cm (LT value) of 31%, was obtained. The glass transition temperature (DSC midpoint) of the polymer was −15° C.

The solids contents were generally determined by drying an aliquot amount of the aqueous polymer dispersion or of the aqueous spray assistant solution at 140° C. in a drying oven to constant weight. In each case, two separate measurements were carried out. The value stated in the respective example is the mean value of the two results of the measurements.

1.2 Polymer Dispersion D2

The preparation of the aqueous polymer dispersion D2 was effected analogously to the preparation of the aqueous polymer dispersion D1, except that the following monomer emulsion was used:

899.0 g of 2-ethylhexyl acrylate,
507.5 g of styrene,
29.0 g of acrylamide,
14.5 g of methacrylamide,
246.5 g of emulsifier solution 1,
29.0 g of emulsifier solution 2 and
359.9 g of demineralized water A polymer dispersion having a solids content of 54.9% by weight, with a light transmittance of a 0.01% strength by weight polymer dispersion at 20° C. and a layer thickness of 2.5 cm (LT value) of 21%, was obtained. The glass transition temperature (DSC midpoint) of the polymer was −15° C.

The two aqueous polymer dispersions D1 and D2 were then diluted with demineralized water to a solids content of 40% by weight.

2. Preparation of the Spray Assistants

2.1 Spray Assistant S1

The preparation of the spray assistant S1 was effected analogously to example 2 (component B) of DE-A 10140551.

1300 kg of demineralized water together with 4100 kg (9.5 kmol) of industrial dihydroxydiphenyl sulfone (comprising about 85% by weight of 4,4'-dihydroxydiphenyl sulfone, about 15% by weight of 2,4'-dihydroxydiphenyl sulfone and small amounts of p-phenolsulfonic acid) in the form of a 60% strength by weight aqueous solution were initially taken at room temperature in a pressure-resistant reactor and 1155 kg of a 30% strength by weight aqueous solution of formaldehyde (11.5 kmol) and 800 kg (3 kmol) of solid sodium sulfite (anhydrous) were added. By adding a little 20% strength by weight aqueous solution of sodium hydroxide, a pH of from 8 to 8.5 was established in the reaction mixture. Thereafter, the pressure-resistant reactor was closed and the reaction mixture was heated to 115° C. with stirring. After a short time at this temperature, the reaction began. The temperature of the reaction mixture increased to 150 to 160° C. and the pressure in the pressure-resistant reactor increased to 4 to 5 bar (gage pressure). By means of external heating, the temperature of the reaction mixture was kept at 160° C. After the reaction mixture had been stirred for 3 hours at 160° C., it was cooled to room temperature and 400 kg of sodium hydrogen sulfate were added to it. The solution obtained had a solids content of about 46% by weight.

2.2 Comparative Spray Assistant SV2

The preparation of the comparative spray assistant SV2 was effected analogously to example 1 of DE-A 19629525.

1.2 kg (9.4 mol) of naphthalene were initially taken at 85° C. in a reactor, and 1.18 kg (11.5 mol) of 98% strength by weight sulfuric acid were added with stirring and cooling so that the temperature of the reaction mixture was always below 150° C. After the end of the sulfuric acid addition, the reaction mixture was allowed to continue reacting for 5 hours at 150° C. Thereafter, the reaction mixture was cooled to 50° C. and, while maintaining a temperature of from 50 to 55° C., 0.80 kg of a 30% strength by weight aqueous solution of formaldehyde (8 mol) was added a little at a time. After the end of the addition, 0.70 kg of demineralized water was immediately added to the reaction mixture and the latter was heated to 100° C. and allowed to continue reacting for 5 hours with further stirring at this temperature. Thereafter, the reaction mixture was cooled to 65° C. and a 35% strength by weight aqueous calcium hydroxide slurry was added until a pH of 8 was reached. Thereafter, the aqueous reaction mixture was filtered over a 200 μm screen and an aqueous solution of the comparative spray assistant SV2 having a solids content of about 35% by weight was obtained.

2.3 Comparative Spray Assistant SV3

The preparation of the comparative spray assistant SV3 was effected analogously to example 1 of DE-A 19629526.

1.15 kg (12 mol) of phenol were initially taken in a reaction vessel under nitrogen at 60° C., and 1.38 kg (13.8 mol) of 98% strength by weight sulfuric acid were added with stirring and continuous cooling so that the temperature of the reaction mixture was always below 110° C. After the end of the addition, the reaction mixture was allowed to continue reacting with further stirring for 3 hours at from 105 to 110° C. Thereafter, the reaction mixture was cooled to 50° C. and, while stirring and maintaining a reaction temperature of from 50 to 55° C., 0.84 kg (8.4 mol) of a 30% strength by weight aqueous formaldehyde solution was added a little at a time. After the end of the formaldehyde addition, 0.75 kg of demineralized water was immediately added and the reaction mixture was heated to 100° C. and left at this temperature for 4 hours with stirring. Thereafter, the reaction mixture was cooled to 60° C. and a further 0.83 kg of demineralized water was added at this temperature. Thereafter, the reaction mixture as heated to 65° C. with further stirring and a 35% strength by weight slurry of calcium hydroxide in demineralized water was added until a pH of 8 was reached. The reaction mixture thus obtained was cooled to room temperature and filtered over a 200 μm screen. The solids content of the aqueous solution of SV3 was about 35% by weight.

The aqueous solutions of the spray assistants S1, SV2 and SV3 were then diluted to a solids content of 20% by weight with demineralized water.

3. Spray Drying

3.1 Antiblocking Agent

The hydrophobic antiblocking agent used was Sipernat® D 17 from Degussa. This is a precipitated silica having a specific surface area (based on ISO 5794-1, Annex D) of 100 $m^2/g$, a mean particle size (based on ASTM C 690-1992) of 7 μm and a tapped density (based on ISO 787-11) of 150 g/l, whose surface was rendered water repellent by treatment with special chlorosilanes.

3.2 Preparation of the Spray-Dried Polymer Powders

The spray drying was effected in a Minor laboratory dryer from GEA Wiegand GmbH (Business Area Niro) with binary nozzle atomization and powder deposition in a fabric filter. The tower entrance temperature of the nitrogen was 135° C. and the exit temperature was 75° C. 2 kg of a spray feed per hour were metered in.

The preparation of the spray feed was effected by adding, at room temperature, 1 part by weight of the aqueous spray assistant solutions S1, SV2 or SV3, diluted to 20% by weight, per 5 parts by weight of the aqueous polymer dispersions D1 or D2, diluted to 40% by weight, and mixing homogeneously with stirring.

Simultaneously with the spray feed, 2% by weight, based on the solids content of the spray feed, of the hydrophobic antiblocking agent Sipernat® D 17 were metered continuously via a weight-controlled twin screw into the top of the spray tower.

Novel polymer powders P1 and P2 were obtained from the aqueous polymer dispersions D1 and D2 with the use of spray assistant S1. The polymer powder of comparative examples PV1 and PV2 were obtained from the aqueous polymer dispersion D1 with the use of the spray assistants SV2 and SV3. The powder yields obtained in the spray drying are shown in table 1.

4. Assessment of the Spray-Dried Polymer Powders 4.1 Redispersing Behavior 30 g of each of the polymer powders obtained were homogeneously mixed at room temperature in a standing cylinder with 70 ml of demineralized water by means of an Ultra Turrax apparatus at 9500 revolutions per minute. Thereafter, the aqueous polymer dispersions obtained were allowed to stand for 4 hours at room temperature, after which a visual assessment was performed to determine the extent to which the polymer phases had separated in the aqueous phases. If no phase separation at all was observed, the redispersing properties were rated as good. In the event of phase separation, the redispersing properties were rated as poor. The results are summarized in table 1.

4.2 Visual Assessment of the Polymer Powders Obtained

The color of the polymer powders obtained was assessed visually. The results obtained are shown in table 1.

4.3 Yellowing Test

Polymer films were produced from the resulting polymer powders by pouring abut 60 g of a 10% strength by weight aqueous polymer dispersion (abovementioned polymer powders dispersed in water by means of Ultra Turrax apparatus) into rubber film plates measuring 7×15 cm and said films were dried for 4 days at room temperature. Thereafter, the films having a thickness of about 2 mm were detached from the rubber film plates and exposed to daylight in the laboratory for 3 months. The assessment of the yellowing of the film was effected according to the rating system, 1 representing no yellow or very little yellowing and 6 representing very pronounced yellowing. The results of the assessment are likewise shown in table 1.

TABLE 1

Assessment of the spray-dried polymer powders

| Powder | Dispersion | Spray assistant | Yield [% by wt.] | Color | Redispersibility | Yellowing of the film |
|---|---|---|---|---|---|---|
| P1 | D1 | S1 | 82 | white | good | 1-2 |
| P2 | D2 | S1 | 83 | white | good | 1-2 |
| PV1 | D1 | SV2 | 84 | yellow | good | 4 |
| PV2 | D1 | SV3 | 83 | brown | good | 5 |

As is clearly evident from the results, the polymer powders P1 and P2 prepared using the novel spray assistants according to the invention can be obtained in high yields. They have good redispersability in water. In comparison with the polymer powders PV1 and PV2 prepared from spray assistants known from the prior art, the polymer powders P1 and P2 prepared according to the invention show no discolorations at all. Furthermore, the polymer powders P1 and P2 prepared according to the invention have substantially less tendency to yellowing in comparison with the polymer powders PV1 and PV2 not prepared according to the invention.

We claim:

1. A process for the preparation of a readily water-redispersible polymer powder comprising spray drying an aqueous polymer dispersion in the presence of a spray assistant A which was obtained by reacting a dihydroxydiphenyl sulfone with from 0.5 to 5 mol of an aliphatic aldehyde of 1 to 6 carbon atoms and from 0.4 to 2 mol of sodium sulfite per mole of dihydroxydiphenyl sulfone at from 90 to 180° C.

2. The process according to claim 1, wherein the dihydroxydiphenyl sulfone used is 4,4'-dihydroxydiphenyl sulfone or a mixture comprising it.

3. The process according to claim 1 wherein the reaction of the dihydroxydiphenyl sulfone is effected in aqueous solution under pressure.

4. The process according to claim 3, wherein the aqueous solution obtained after the reaction is brought to a pH of >7.

5. The process according to claim 1 wherein the spray assistant A is used in the form of a mixture with at least one other spray assistant B.

6. The process according to claim 5, wherein the total amount of the spray assistant comprises >50% by weight of spray assistant A.

7. The process according to claim 1 wherein from 0.1 to 40 parts by weight of spray assistant A are used per 100 parts by weight of polymer.

8. The process according to claim 1 wherein the polymer comprises from 50 to 99.9% by weight of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate and/or ethylene incorporated in the form of polymerized units.

9. The process according to claim 1 wherein the polymer has a glass transition temperature of from −60 to +150° C.

10. The process according to claim 1, wherein, in addition to the spray assistant A, at least one antiblocking agent is used for the spray drying.

11. The process of claim 1, wherein said powder is comprised of polymer particles having a weight average diameter of from 10 to 1,000 nm.

12. The process of claim 1, wherein said powder is comprised of polymer particles having a weight average diameter of from 50 to 500 nm.

13. The process of claim 1, wherein said powder comprises 0.1 to 40 parts by weight of said spray assistant A, based on 100 parts by weight of said polymer.

14. A polymer powder obtainable by the process according to claim 1.

15. The polymer powder according to claim 14, wherein the polymer comprises from 50 to 99.9% by weight of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate and/or ethylene incorporated in the form of polymerized units.

16. The polymer powder of claim 14, wherein said powder is comprised of polymer particles having a weight average diameter of from 10 to 1,000 nm.

17. The polymer powder of claim 14, wherein said powder is comprised of polymer particles having a weight average diameter of from 50 to 500 nm.

18. The polymer powder of claim 14, wherein said powder comprises 0.1 to 40 parts by weight of said spray assistant A, based on 100 parts by weight of said polymer.

19. An aqueous polymer dispersion obtainable by redispersing polymer powder according to claim 15 in an aqueous medium.

* * * * *